(12) United States Patent
Schaub et al.

(10) Patent No.: US 7,190,695 B2
(45) Date of Patent: Mar. 13, 2007

(54) FLEXIBLE APPLICATION OF MAPPING ALGORITHMS WITHIN A PACKET DISTRIBUTOR

(75) Inventors: Marc Schaub, Sunnyvale, CA (US); Balakrishnan Ramakrishnan, Sunnyvale, CA (US); Kumar Mehta, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 831 days.

(21) Appl. No.: 09/967,563

(22) Filed: Sep. 28, 2001

(65) Prior Publication Data
US 2003/0063611 A1    Apr. 3, 2003

(51) Int. Cl.
*H04L 12/28*    (2006.01)
(52) U.S. Cl. .................................. 370/392; 370/395.32
(58) Field of Classification Search ................ 370/389, 370/392, 395.1, 465, 395.32
See application file for complete search history.

(56) References Cited

U.S. PATENT DOCUMENTS

| | | | |
|---|---|---|---|
| 5,790,541 A * | 8/1998 | Patrick et al. ............... | 370/392 |
| 5,909,564 A | 6/1999 | Alexander et al. | |
| 6,081,523 A | 6/2000 | Merchant et al. | |
| 6,108,306 A | 8/2000 | Kalkunte et al. | |
| 6,775,280 B1 * | 8/2004 | Ma et al. ..................... | 370/392 |
| 6,778,495 B1 * | 8/2004 | Blair ........................... | 370/230 |
| 6,785,274 B2 * | 8/2004 | Mahajan et al. ............. | 370/390 |
| 6,804,240 B1 * | 10/2004 | Shirakawa et al. .......... | 370/392 |
| 6,850,513 B1 * | 2/2005 | Pelissier ...................... | 370/351 |
| 6,876,654 B1 * | 4/2005 | Hegde ......................... | 370/392 |

FOREIGN PATENT DOCUMENTS

WO    WO 00/70827 A2    11/2000

OTHER PUBLICATIONS

Seifert, Richard, *The Switch Book, The Complete Guide to LAN Switching Technology*, 2000, Wiley Computer Publishing, New York, pp. 358-377.

* cited by examiner

*Primary Examiner*—Huy D. Vu
*Assistant Examiner*—Christine Ng

(57) ABSTRACT

Distributing packets from an input link to multiple output links involves categorizing each incoming packet, selecting a mapping algorithm based on the packet category, and using the selected mapping algorithm for each packet to determine an output link for the respective packet. If packets are from a category that requires the order of the packets to be maintained, then the selected mapping algorithm causes packets from the same set of packets to be distributed to the same output link. If packets are from a category that does not require the order of the packets to be maintained, then the selected mapping algorithm can cause packets to be distributed more evenly among the multiple output links. Hashing can be used to distribute in-order packets from the same set to the same output link. Load balancing and round-robin distribution can be used to distribute out-of-order packets more evenly across the output links.

20 Claims, 8 Drawing Sheets

| Bits | Description |
|---|---|
| 31:29 | Scheme Select<br>0 = hashing<br>1 = round-robin<br>2 = load balancing based on packets<br>3 = load balancing based on bytes |
| 28:27 | Hash Variant<br>0 = normal XOR function<br>1 = swizzle every other 4 bit nibble before XOR |
| 26:22 | FREE |
| 21 | MAC destination address enable |
| 20 | MAC source address enable |
| 19 | Ethernet type enable |
| 18 | VLAN ID enable |
| 17:16 | FREE |
| 15:10 | IP source address enable -- 6 bit mask for IP src to mask 0 to 31 bits |
| 9: 4 | IP destination address enable |
| 3 | IP Protocol enable |
| 2 | IP Type of service enable |
| 1 | Source socket enable |
| 0 | IP destination socket enable |

Field Select Bits { bits 21 through 0 }

FIG. 6

FLEXIBLE APPLICATION OF MAPPING ALGORITHMS WITHIN A PACKET DISTRIBUTOR

FIELD OF THE INVENTION

The invention relates to packet-based communications systems, and more specifically to the distribution of packets from an input link to multiple output links, for example, from one 10 Gigabit Ethernet (GbE) input link to ten 1 GbE output links.

BACKGROUND OF THE INVENTION

Packet-based networking architecture is often described in terms of layers, where each layer is responsible for communicating with the same peer protocol running on an opposite machine and for providing services to the layer above it. The layered architecture, referred to as the Open System Interconnect (OSI) model, has been generally defined by the International Organization for Standardization. The layers of the OSI model include the physical layer (layer 1), the data link layer (layer 2), the network layer (layer 3), the transport layer (layer 4), the session layer (layer 5), the presentation layer (layer 6), and the application layer (layer 7). Layers of particular interest herein include layers 2, 3, and 4. Ethernet is a common layer 2 protocol in which packets are switched between network nodes (referred to as bridges or switches) in variable-length packets based on information in an Ethernet header. The Internet Protocol (IP) is a common layer 3 protocol in which variable-length packets are routed between network nodes (referred to as routers) based on information in an IP header. Transmission control protocol (TCP) and user datagram protocol (UDP) are common layer 4 protocols which provide an interface between layer 3 protocols and higher layer protocols. TCP is a connection-oriented protocol with features that provide reliable data delivery and UDP is a connectionless protocol that dispenses with the reliability services provided by TCP.

Traditionally, layer 2 switching was performed by switches and layer 3 routing was performed by routers, where the switches and routers were separate network nodes. However, newer systems, referred to as "switch/routers" and "layer 3 switches," have been developed that have the ability to switch or route packets depending on the specific needs of each individual packet.

As packet-based network traffic continues to increase, there is a need to provide faster and more intelligent network nodes. Because of technological limitations and economic considerations, the implementation of faster and more intelligent components and sub-systems may not occur in parallel. For example, higher rate physical layer components, such as lasers and modulators, may be available before packet processors are developed that can handle the higher transmission rates. Because new components and sub-systems are not developed and implemented in parallel, there is often a need to interface between components and sub-systems that support different transmission rates. For example, ten 100 Megabit Ethernet (MbE) links can be used to create a 1 GbE connection between two 1 GbE switches.

A technique known as link aggregation is commonly used to connect two network nodes with multiple physical links in order to increase the transmission capacity between the two network nodes. Link aggregation involves combining multiple physical links into a single logical link with a distribution function at the transmitting node and a collection function at the receiving node. The distribution function involves receiving packets from a higher rate link and distributing the packets among multiple lower rate links and the collection function involves receiving the packets from the multiple lower rate links and combining the packets onto a single higher rate link.

Distributing packets from an incoming link to multiple output links involves mapping each packet to one of the multiple output links. Some types of packets require that all of the packets from a particular set of packets are maintained in the same order during packet distribution (in-order packets). A set of in-order packets is also referred to as a "conversation." In contrast, other types of packets do not require that all of the packets from a particular set of packets are maintained in the same order during packet distributed (out-of-order packets). A set of packets is defined as a group of packets that have some similar characteristic (i.e., switched, routed, same flow, same MAC source address/destination address, same IP source address/destination address, same socket, etc.). An efficient way to maintain the order of a set of packets is to distribute all of the packets from the same set to the same output link. For example, FIG. 1 depicts a series of incoming packets from four different sets of packets (set A, set B, set C, and set D) that are distributed among three output links (output link 1, output link 2, and output link 3) by a packet distributor 102. The packets are distributed to the three output links such that packets from the same set are output to the same output link, thereby maintaining the original order of the packets within each set. Specifically, the set A packets are sent to output link 3, the set B packets are sent to output link 1, and the set C and D packets are sent to output link 2. Distributing packets from the same set to the same output link is typically accomplished by parsing out fields in the header of each packet and then applying a mapping algorithm to the parsed field(s). The same field(s) is/are parsed from each packet and the same mapping algorithm is applied to each packet. Mapping algorithms may include sampling bits from the parsed field(s) or performing a hash function, a modulo-n function, or some other manipulation on the bits in the parsed fields. Applying the same mapping algorithm to the same field(s) of each incoming packet ensures that packets from the same set are distributed to the same output link.

FIG. 2 depicts a packet distributor 202 that includes a parser 204 and a mapping module 206 that are used to generate an output link ID for each incoming packet. As shown in FIG. 2, the parser provides two fields, for example the layer 2 source address and destination address, to the mapping module and the mapping module generates a link ID that identifies the output of the packet.

While the approach to packet distribution described with reference to FIGS. 1 and 2 works well when all of the packets are in-order packets, applying the same mapping algorithm to the same field(s) of each incoming packet does not work as well in an environment where some packets are in-order packets and some of the packets are out-of-order packets. Specifically, the above-described approach does not offer the flexibility to apply different mapping algorithms to different types of packets. That is, using the above-described approach, the same mapping algorithm is applied to each incoming packet regardless of whether the packet is an in-order packet or an out-of-order packet. In systems that handle different types of packets, such as switch/routers, there are advantages to being able to distribute different types of packets differently. For example, out-of-order packets from the same set of packets could be distributed to different output links to create a more even traffic flow among the output links.

Although the distribution function of an aggregated link involves receiving packets from an input link and mapping the packets to an output link, the distribution function is different from well-known switching and routing functions. Specifically, switching and routing involve forwarding packets based on forwarding table look-ups that are performed using the layer 2 or layer 3 destination address in the packet headers. The distribution function does not involve forwarding table look-ups based on the layer 2 or layer 3 destination address. The distribution function is meant to be a simple and quick way to distribute packets among multiple output links that adds little delay to the packets.

There are other techniques for distributing packets among multiple aggregated output links that involve segmenting packets and distributing the packet segments among multiple output links at the transmitting node and then re-assembling the packet segments into packets at the receiving node. While these techniques work well, they require specific synchronized logic at both the transmitting node and the receiving node to ensure that the packet segments are properly re-assembled.

In view of the need to interface links of different transmission rates and the limitations of prior art packet distribution techniques, what is needed is an efficient technique for distributing packets to multiple output links that has the flexibility to handle different types of packets differently.

SUMMARY OF THE INVENTION

A system and method for distributing packets from an input link to multiple output links involves categorizing each incoming packet, selecting a mapping algorithm based on the packet category, and then using the selected mapping algorithm for each packet to determine an output link for the respective packet. Categorizing the packets and selecting mapping algorithms based on the packet categories allows for more intelligent and flexible packet distribution among the multiple output links. For example, in-order packets can be distributed such that packets from the same set are sent to the same output link while out-of-order packets can be distributed such that packets are spread more evenly across the multiple output links. Hashing is a technique that can be used to distribute in-order packets from the same set to the same output link. Load balancing and round-robin distribution are two techniques that can be used to distribute out-of-order packets more evenly across the output links.

In an embodiment, the incoming packets are placed into categories that differentiate between switched and routed packets, packets that utilize IP at the network layer, and packets that utilize the transmission control protocol (TCP) or user datagram protocol (UDP) at the transport layer. In an embodiment, each packet is categorized into one of nine categories: switched IP/TCP, switched IP/UDP, switched IP/other, switched other, routed IP/TCP, routed IP/UDP, routed IP/other, routed other, and multi-protocol label switching (MPLS). Although a particular number of categories and particular category types are described for example purposes, other numbers of categories and category types can be used in other embodiments.

A system for system for distributing packets from an input link to multiple output links includes a packet categorizer and an output link determination unit. The packet categorizer categorizes each packet that is received on the input link. The output link determination unit selects a mapping algorithm for each categorized packet based on the category of the packet and determines an output link for the packet using the selected mapping algorithm, the determined output link being one of the multiple output links.

In an embodiment, the output link determination unit includes a mapping algorithm selector for selecting a mapping algorithm from a group of mapping algorithms. In a further embodiment, the mapping algorithm selector selects a mapping algorithm from one of hashing, round-robin distribution, and load balancing.

In an embodiment the packet categorizer includes a parser for parsing fields from the header of each packet and a categorizer unit for determining the category of each packet from the parsed fields. In a further embodiment, the output link determination unit includes a hashing unit for hashing at least one of the parsed fields to generate an output link ID, a round-robin unit for determining output link IDs on a round-robin basis, and a load balancing unit for determining output link IDs in response to output link load information.

A method for distributing packets from an input link to multiple output links involves categorizing a packet that is received on an input link, selecting a mapping algorithm for the categorized packet based on the category of the packet, and determining an output link for the packet using the selected mapping algorithm, the determined output link being one of the multiple output links.

In an embodiment of the method, the mapping algorithm is selected from a group of mapping algorithms. In a further embodiment, the group of mapping algorithms includes hashing, round-robin distribution, and load balancing.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 6 depicts an example of a 32-bit mapping algorithm ID that is output from the mapping algorithm selector of FIG. 5.

DETAILED DESCRIPTION OF THE INVENTION

Figure 3:
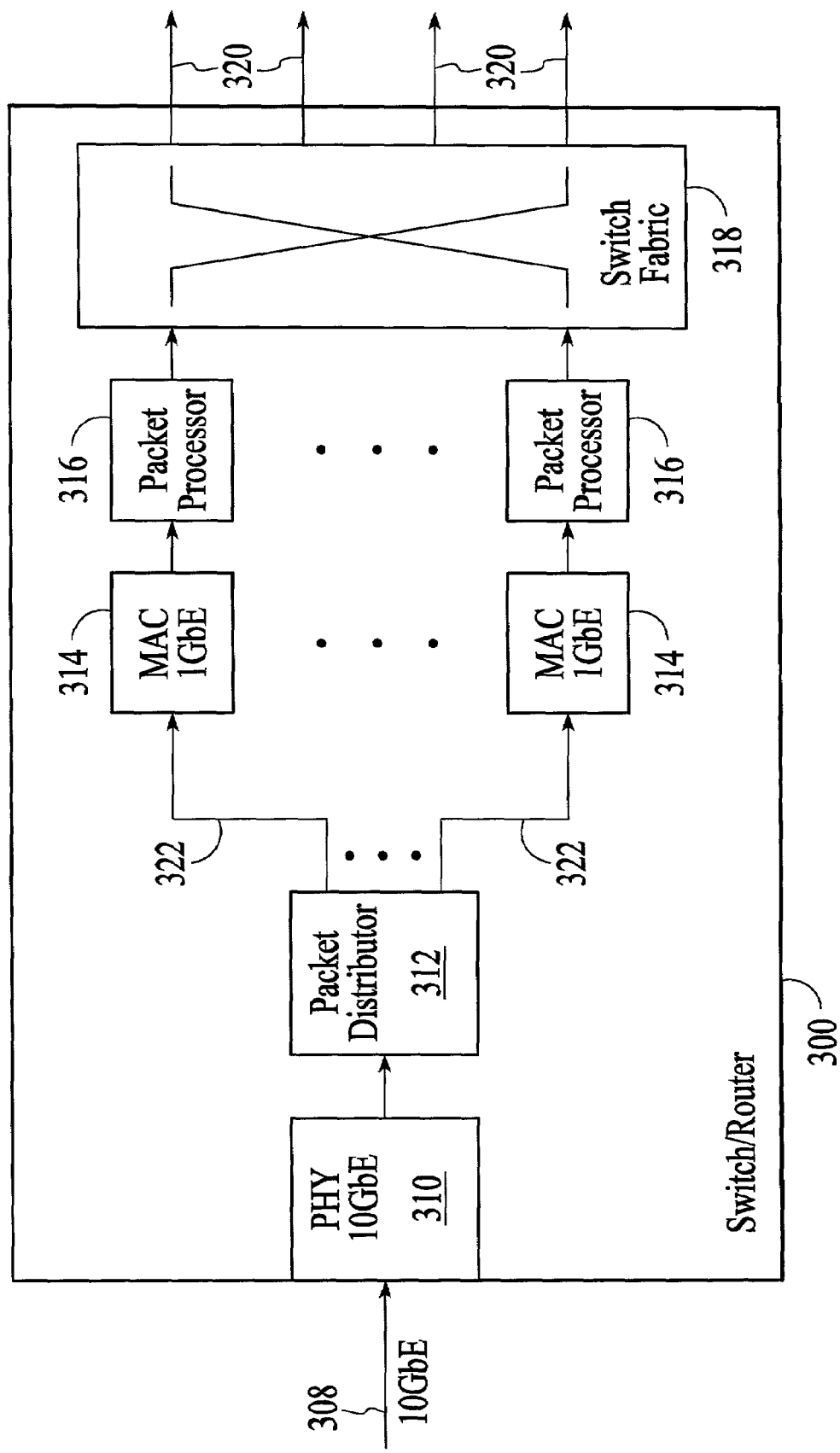
FIG. 3 depicts a switch/router that is connected to a 10 GbE physical link that includes a packet distributor for distributing packets from the 10 GbE physical link to multiple 1 GbE links.

FIG. 3 depicts a switch/router 300 that is connected to a 10 GbE physical link 308. The switch/router has the ability to perform layer 2 switching (also referred to as bridging) of packets and layer 3 routing of packets. The switch/router includes a 10 GbE physical layer unit (PHY) 310, a packet distributor 312, link-specific data link layer packet processors (MACs) 314, link-specific network layer packet processors (PPs) 316, a switch fabric 318, and additional physical links 320. In the embodiment of FIG. 3, the switch/router handles data as Ethernet packets although the invention can be adapted to switch/routers that handle data using other protocols. A brief description of the individual functional units is provided first, followed by a more detailed description of the packet distributor, which is the focus of the invention. Throughout the description, similar reference numbers may be used to identify similar elements.

The physical links 308 and 320 may include optical fibers, copper wires, coaxial cables, or any other physical link media, which are used to create connections between the switch/router 300 and other network nodes. In the embodiment of FIG. 3, the incoming physical link 308 is an optical fiber that carries packets according to the IEEE 802.3ae 10 GbE standard.

The PHY 310 receives incoming signals from the physical link 308 and converts the signals into a format that can be understood by the switch/router 300. In the embodiment of FIG. 3, the PHY converts optical signals to electrical signals, decodes the electrical signals, and de-serializes the signals. At full loading, the PHY forwards packets to the packet distributor 312 at 10 gigabits per second (Gbs). In the embodiment of FIG. 3, packets are received by the PHY as Ethernet packets, however, the data can be received using other protocols, such as ATM, and then converted to Ethernet packets.

The packet distributor distributes packets from a 10 Gbs link to multiple 1 Gbs links. The function of the packet distributor is the focus of the invention that is described in detail below.

The MACs 314 manage the layer 2 addressing control for switched packets. The MACs read the layer 2 headers of the incoming switched packets and perform layer 2 look-ups to determine how to forward the incoming packets to their next destination within the switch. The MACs forward incoming packets to the packet processors 316. Throughout the description, the terms "switching" and "switched packets" are synonymous with the terms "bridging" and "bridged packets" as is known in the field of packet-based networking.

The packet processors 316 perform next hop (layer 3) address look-ups for routed packets. In an IP network, the next hop of a packet is determined by the IP destination address of the IP header. Next hop look-ups are not required for switched packets. The packet processors also control the input of packets into the switch fabric 318.

The switch fabric 318 creates datapaths that connect the incoming packets to the desired output physical links 320. Switch fabrics that are utilized in Ethernet switch/routers are well known and may include shared memory, shared bus, and crosspoint matrices.

In the embodiment of FIG. 3, the individual packets of the incoming packet stream are distributed among multiple output links 322 before the packets are processed at layer 2 or layer 3. Specifically, in the embodiment of FIG. 3, a 10 Gbs incoming packet stream is distributed among ten 1 Gbs links. The 10 Gbs incoming packet stream is distributed among ten 1 Gbs links because 1 Gbs sub-systems (i.e., data link layer processors (MACs) and network layer processors) are readily available and because the switch/router utilizes a 1 Gbs architecture. Using readily available sub-systems and an established switch/router architecture enables high-speed links, such as 10 Gbs links, to be accommodated by an established switch/router in an economical manner. Specifically, specialized 10 Gbs layer 2 and 3 processors are not required and installed 1 Gbs switch/routers do not need to be replaced to support 10 Gbs links.

In order to intelligently distribute the packets of the incoming 10 Gbs packet stream among the multiple 1 Gbs output links 322, the packet distributor 312 categorizes each packet and then selects a mapping algorithm based on the packet category. The selected mapping algorithm for each packet is used to determine an output link for the respective packet. Categorizing the packets and selecting mapping algorithms based on the packet categories allows the packet distributor to provide more intelligent and flexible packet distribution among the multiple output links. For example, in-order packets can be distributed such that packets from the same set are sent to the same output link while out-of-order packets can be distributed such that packets are spread more evenly across the multiple output links. Hashing is a technique that is used to distribute in-order packets from the same set to the same output link. For example, a set of packets with the same layer 2 source and destination addresses can be distributed to the same output link in order. Load balancing and round-robin distribution are two techniques that can be used to distribute out-of-order packets more evenly across the output links. Load balancing and round-robin distribution cannot be used to distribute in-order packets without some mechanism to maintain the order of the packets. However, hashing can be used to distribute out-of-order packets even though maintaining the order of the packets is not required. For example, a set of out-of-order packets with the same IP destination address can be distributed to the same output link.

Figure 4:
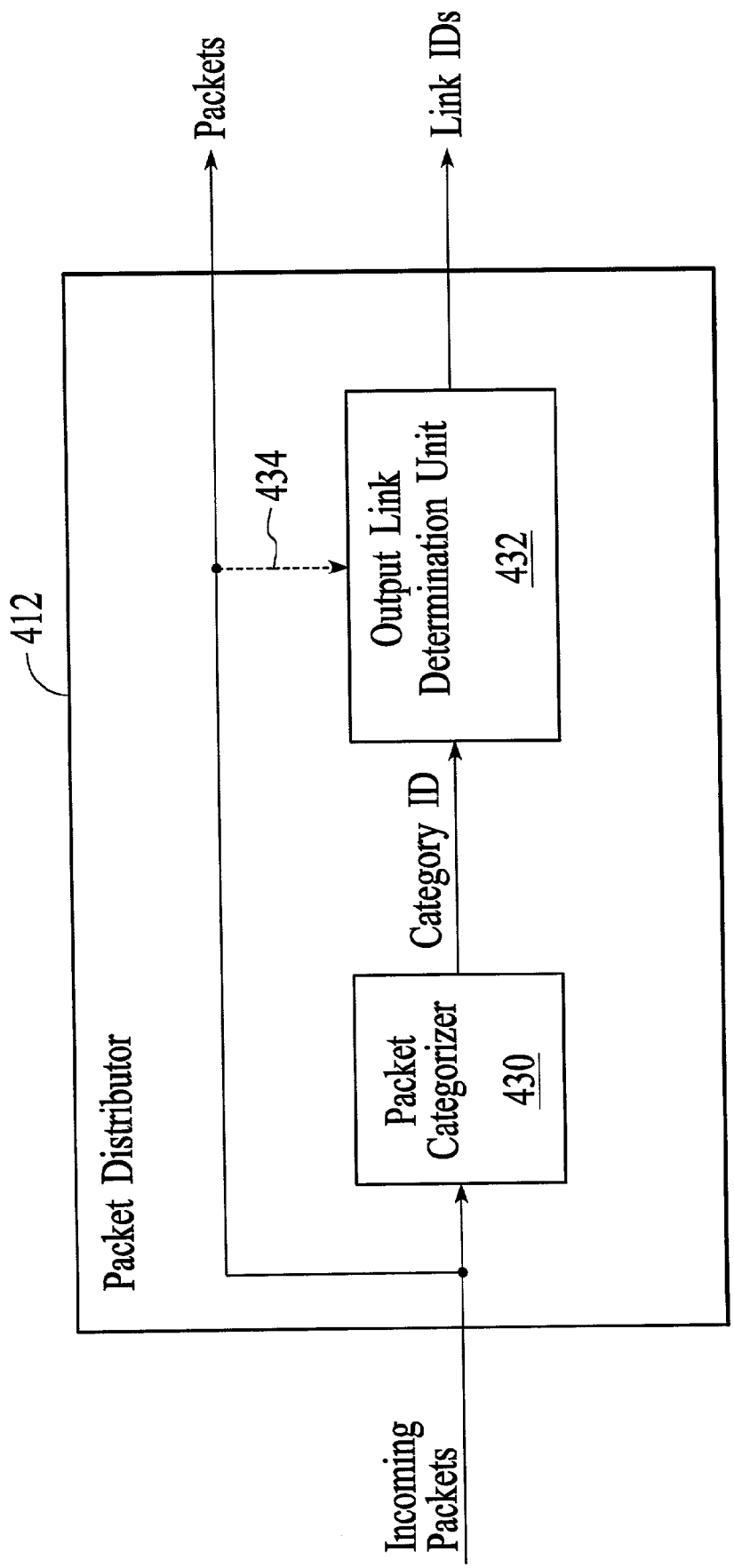
FIG. 4 depicts an expanded view of a packet distributor that categorizes packets and selects mapping algorithms based on packet categories in accordance with an embodiment of the invention.

FIG. 4 depicts an expanded view of a packet distributor 412, in accordance with an embodiment of the invention, which categorizes packets and selects mapping algorithms based on packet categories. The packet distributor includes a packet categorizer 430 and an output link determination unit 432. The packet distributor receives packets on an input link and distributes packets to output links by generating an output link ID for each packet that identifies the intended output link of the respective packet.

The packet categorizer 430 of the packet distributor 412 categorizes each packet into one of a group of categories. In an embodiment, the packet categories differentiate between switched and routed packets, packets that utilize IP at the network layer, and packets that utilize the transmission control protocol (TCP) or user datagram protocol (UDP) at the transport layer. In an embodiment, each packet is categorized into one of nine categories: switched IP/TCP, switched IP/UDP, switched IP/other, switched other, routed IP/TCP, routed IP/UDP, routed IP/other, routed other, and multi-protocol label switching (MPLS). In the embodiment of FIG. 4, the packet categories differentiate between in-order packets and out-of-order packets, such that all of the packets within a particular category include either in-order packets or out-of-order packets. Although a particular number of categories and particular category types are described for example purposes, other numbers of categories and category types can be used in other embodiments.

In an embodiment, the packet categorizer 430 parses the header fields of each packet and reads the parsed fields to categorize each packet into one of the established categories. A category ID for each packet is output from the packet categorizer and input into the output link determination unit 432. In an embodiment, the category ID that is output from the packet categorizer is a four-bit field that identifies one of the above-identified nine possible packet categories.

The output link determination unit 432 of the packet distributor selects a mapping algorithm for each packet based on the packet category of each packet and then uses the mapping algorithm to determine an output link ID for each packet. Packet-specific information related to each packet may be provided to the output link determination unit as indicated by dashed line 434 for use in determining the output link ID. The mapping algorithm for each incoming packet is selected from a group of mapping algorithms. In an embodiment, the group of mapping algorithms includes a hashing algorithm, a round-robin algorithm, and a load balancing algorithm. The group of mapping algorithms is given for example purposes and can be modified to include different mapping algorithms.

Figure 5:
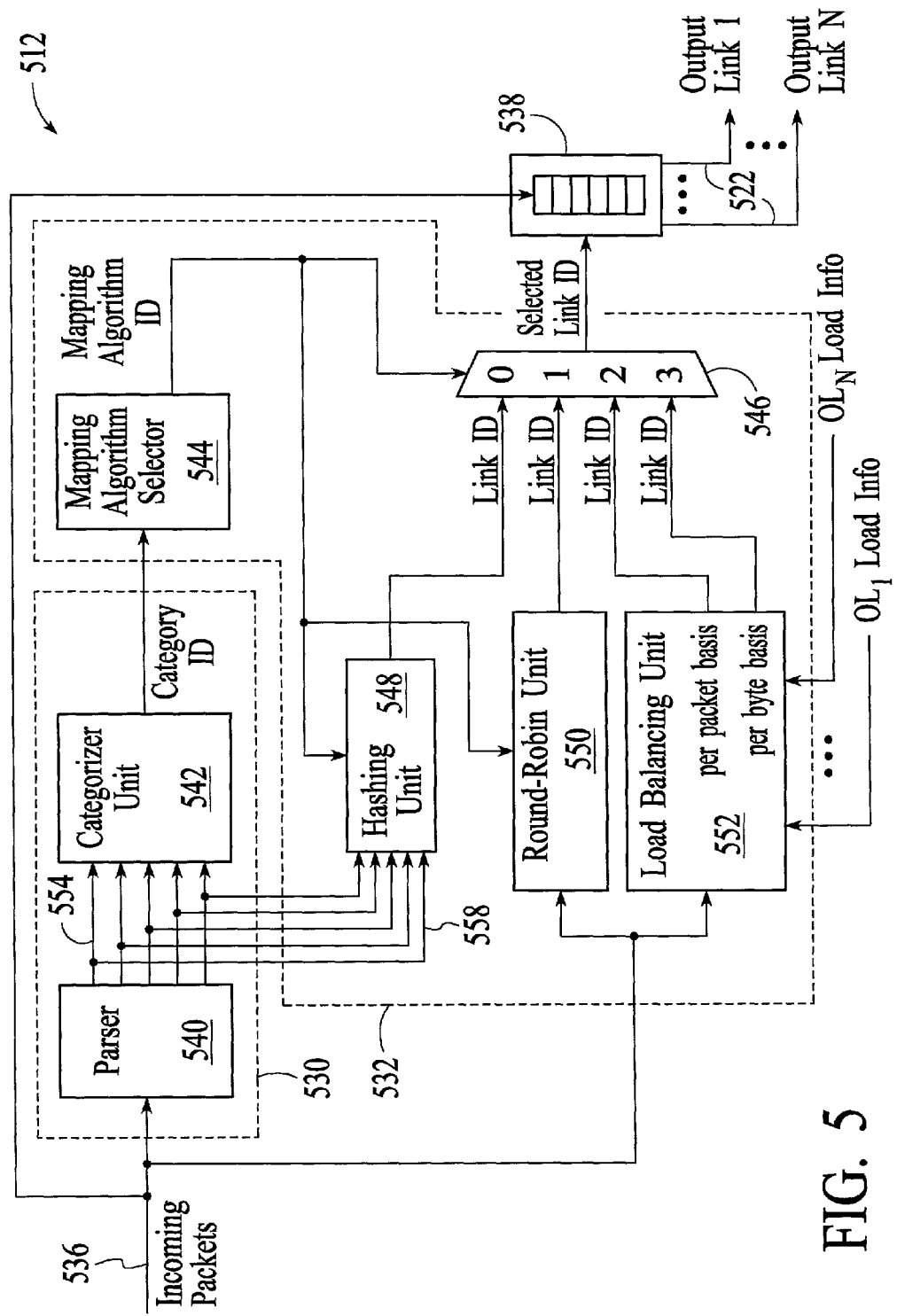
FIG. 5 depicts an expanded view of an embodiment of the packet distributor from FIG. 4.

FIG. 5 depicts an expanded view of an embodiment of the packet distributor 412 from FIG. 4. The expanded view of the packet distributor 512 includes an input link 536, the packet categorizer 530, the output link determination unit 532, an output buffer 538, and multiple output links 522. The packet categorizer includes a parser 540 and a categorizer unit 542 and the output link determination unit includes a mapping algorithm selector 544, a mapping algorithm multiplexer 546, a hashing unit 548, a round-robin unit 550, and a load balancing unit 552. A description of the individual functional units within the packet categorizer and the output link determination unit is provided below along with a description of the packet distribution operation.

In the embodiment of FIG. 5, packets carried on the input link 536 are provided to the packet categorizer 530, the output link determination unit 532, and the output buffer 538. Packets provided to the packet categorizer are used to categorize the packets as described below. Packets provided to the output link determination unit are used to determine output link IDs for the packets using a round-robin or a load balancing algorithm and packets provided to the output buffer are buffered before being dispatched to a particular one of the multiple output links.

Packets that are provided to the packet categorizer 530 go first to the parser 540. At the parser, fields of interest from the header of each packet are parsed from the packet. In an embodiment, fields of interest from a packet header include the layer 2 (i.e., MAC) source address, the layer 2 (i.e., MAC) destination address, an MPLS label, a virtual local area network (VLAN) ID, the Ethernet type/length field, the layer 3 (i.e., IP) source address, the layer 3 (i.e., IP) destination address, the IP protocol field, the IP type of service (TOS), the IP source socket, and the IP destination socket. The parsed fields for each packet are forwarded to the categorizer unit 542 through example connections 554. The categorizer unit reads some or all of the parsed fields of each packet to determine the category in which the packet belongs. In an embodiment, the packet categorizer reads the destination MAC address (layer 2) to determine if the packet is switched or routed. If the destination MAC address matches the IP address of the switch/router, then the packet is a routed packet. The packet categorizer reads the Ethernet type/length field to determine the network layer protocol of the packet (i.e., IP or other) and the IP protocol field to determine the transport layer protocol of the packet (i.e., TCP, UDP, or other). By reading the above-identified fields, the packets can be classified as one of switched IP/TCP, switched IP/UDP, switched IP/other, switched other, routed IP/TCP, routed IP/UDP, routed/other, and routed other. The categorizer unit outputs a category ID for each packet and the category ID is used by the output link determination unit to select a mapping algorithm for the respective packet.

The mapping algorithm selector 544 of the output link determination unit 532 receives the category ID for each packet from the packet categorizer 530 and uses the category ID to select a mapping algorithm. In an embodiment, each category ID is linked to a particular mapping algorithm in a simple look-up table, such that mapping algorithms are selected using the category IDs as the search key. The selected mapping algorithm for each packet is identified by a mapping algorithm ID that is output from the mapping algorithm selector in response to receiving a category ID. In an embodiment, the mapping algorithm ID for each packet category includes programmable registers that define the particular mapping algorithm. For example, each mapping algorithm ID includes registers for defining the type of mapping algorithm (i.e., hashing, round-robin, load balancing) and specifics of the particular mapping algorithm. The mapping algorithm ID can be easily adjusted by changing the values of certain registers. A more detailed description of the hashing, round-robin, and load balancing algorithms is provided below. In an embodiment, when hashing is the selected algorithm, the mapping algorithm ID identifies the hashing scheme and the particular fields that are to be hashed. In an embodiment, a 32-bit mapping algorithm ID is used to identify the selected mapping algorithm. Example fields within a 32-bit mapping algorithm ID are depicted in FIG. 6.

The mapping algorithm ID that is output from the mapping algorithm selector 544 is input into the mapping algorithm multiplexer 546. The mapping algorithm ID controls which output link ID is forwarded from the mapping algorithm multiplexer to the output buffer 538. For example, referring to FIG. 5, the mapping algorithm ID controls whether the multiplexer forwards a link ID from the hashing unit 548, the round-robin unit 550, or the load balancing unit 552. In an embodiment, the mapping algorithm ID includes scheme select bits (i.e., bits 29–31 in the mapping algorithm ID of FIG. 6) that control the multiplexer. In the embodiment of FIG. 5, if the scheme select bits are equal to "0," then an output link ID from the hashing unit is forwarded from the output link determination unit. If the scheme select bits are equal to "1," then an output link ID from the round-robin unit is forwarded from the output link determination unit. If the scheme select bits are equal to "2," then an output link ID from the load balancing unit based on packet count is forwarded from the output link determination unit and if the scheme select bits are equal to "3," then an output link ID from the load balancing unit based on byte count is forwarded from the output link determination unit. The mapping algorithm related to a particular packet category can be changed by changing the scheme select bits of the mapping algorithm ID.

The hashing unit 548 generates output link IDs by hashing certain fields of the packet headers. The hashing unit receives the parsed fields of packet headers and the mapping algorithm ID to determine an output link ID. In the embodiment of FIG. 5, the hashing unit receives the parsed fields of packet headers from the parser 540 via example connections 558. Hashing algorithms are applied to categories of packets that are required to be maintained in order. To maintain the order of packets, the hashing function operates on selected fields of a particular category. For example, to maintain the order of packets in the switched IP/TCP category, the hashing function operates on the layer 2 source and destination address fields of each packet. The hashing function may operate on a different combination of fields to control the distribution of other categories of packets.

The particular hashing algorithm that is used to distribute a category of packets may include any of a variety of known hashing functions. For example, the hashing function may involve simply reading a few bits from a specific field of a packet header, XORing particular bits, and/or swizzling every other four bit nibble. Referring back to the 32-bit mapping algorithm of FIG. 6 for example purposes, bits 27 and 28 define specific hash variants and bits 0–21 represent the various fields that can be hashed. The specific fields that are to be hashed are established by setting the respective field select bits. The hashing function of a particular packet category can be easily changed by setting any combination of the hash variant and field select bits.

The round-robin unit 550 generates output link IDs on a round-robin basis. Round-robin distribution is applied to categories of packets that are not required to be maintained in order (out-of-order packets). In an embodiment, a certain number of packets are mapped to each output link and the output links are rotated in a round-robin manner. In one example, the selected output link is rotated after receiving one packet, and in another example, the selected output link is rotated after receiving ten packets. The round-robin algorithm may be supported by a round-robin counter that is incremented for each packet or group of packets that is distributed using the round-robin algorithm. In the embodiment of FIG. 5, the round-robin unit receives packets from the input link for use in carrying out the round-robin algorithm. Specifically, the round-robin unit reads the end of packet indicators to determine when to switch to the next output link. Round-robin distribution promotes an equal distribution of packets among the available output links. In an embodiment, certain output links can be removed from the round-robin rotation, for example, if the output link is experiencing congestion.

The load balancing unit 552 distributes packets among the multiple output links in a manner that attempts to balance the load at each output link. Load balancing is applied to categories of packets that are not required to be maintained in order (out-of-order packets). In an embodiment, the load balancing algorithm involves obtaining load information related to each output link and distributing packets based on the link-specific load information. For example, a load balancing algorithm may involve identifying the number of queued packets at each output link and distributing packets to the queue with the fewest number of packets. Load balancing is a continuous process that tries to maintain balanced queue loads among the output links. In the embodiment of FIG. 5, the load balancing unit can measure queue loading and perform load balancing on a per packet basis or on a per byte basis. In the embodiment of FIG. 5, the load balancing unit receives packets from the input link and load information from the multiple output links 522 for use in carrying out the load balancing algorithm. The received packets are used to update queue lengths. In an alternative embodiment, the load balancing algorithm involves receiving throughput information from each output link and distributing packets based on the link-specific throughput information in addition to, or instead of, queue loading information. For example, packets can be distributed to the output links that are processing packets at the fastest rate.

Although some examples of mapping algorithms have been described, it should be understood that the mix of mapping algorithms that are possible and the specifics of each mapping algorithm can be customized for a particular use without deviating from the invention.

Figure 7:
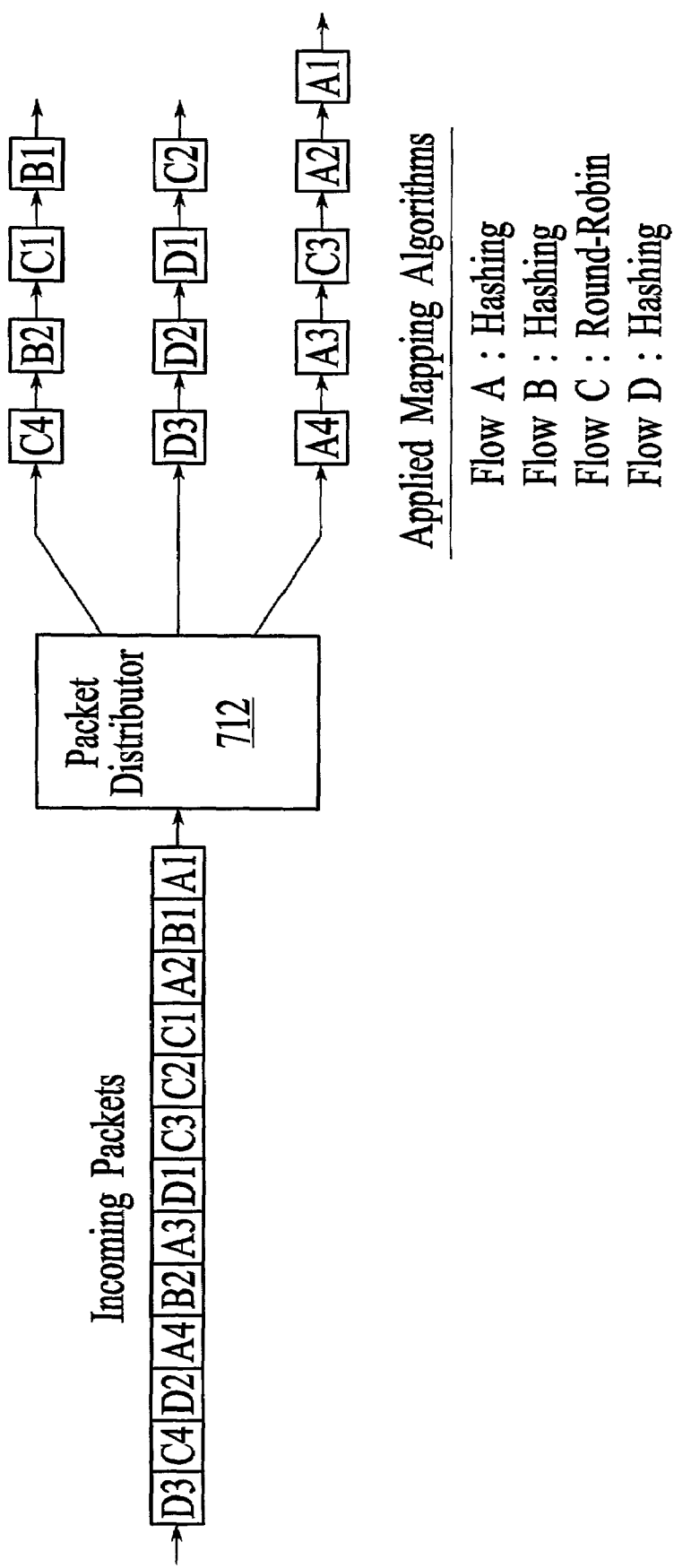
FIG. 7 depicts an example output distribution of an incoming packet stream in which the mapping algorithm for each packet is a function of the packet category in accordance with an embodiment of the invention.

FIG. 7 depicts an example output distribution of an incoming packet stream from the packet distributor 712, in which the mapping algorithm for each packet is a function of the packet category in accordance with an embodiment of the invention. The incoming packet stream is similar to the incoming packet stream depicted in FIG. 1 and includes four different sets of packets (sets A, B, C, and D). Using the technique described above, the mapping algorithm applied to each set of packets is dependent on the packet category and different mapping algorithms can be applied to different packet categories. In the example of FIG. 7, packet sets A, B, and D fall within a category (or categories) that requires packets to be maintained in order and packet set C falls within a category that does not require packets to be maintained in order. A hashing mapping algorithm is applied to packet sets A, B, and D and a round-robin mapping algorithm is applied to packet set C. The hashing algorithm causes packets from the same set to be output on the same output link and the round-robin algorithm causes packets from the same set to be output in a round-robin manner. Specifically, the set A packets are sent to output link 3 using a hashing algorithm, the set B packets are sent to output link 1 using the same hashing algorithm, the set C packets are distributed to output links 1, 2, and 3 using a round-robin algorithm (one packet per link, starting at output link 1), and the set D packets are distributed to output link 2 using the hashing algorithm. Although the same hashing algorithm is applied to packet sets A, B, and D for example purposes, if the packets from sets A, B, and D fall into different packet categories, the particular hashing algorithms that are applied to the sets can be different.

Figure 1:
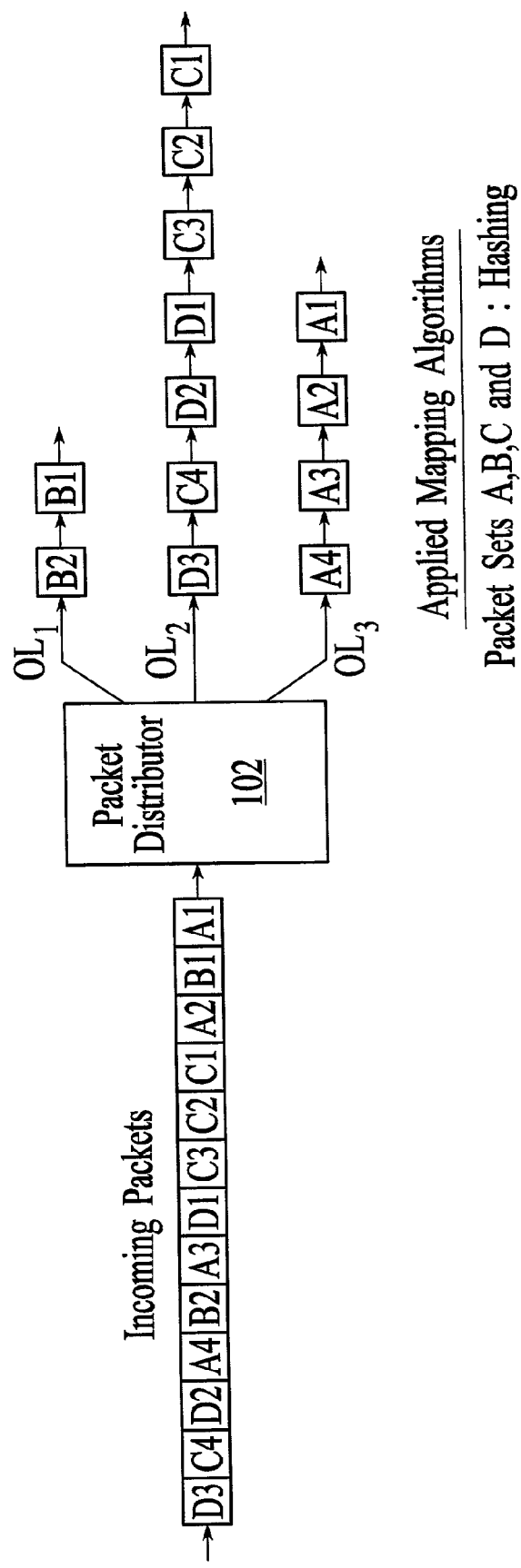
FIG. 1 depicts an example output distribution of an incoming packet stream, in which the same mapping algorithm is applied to each packet as is known in the prior art.
Figure 2:
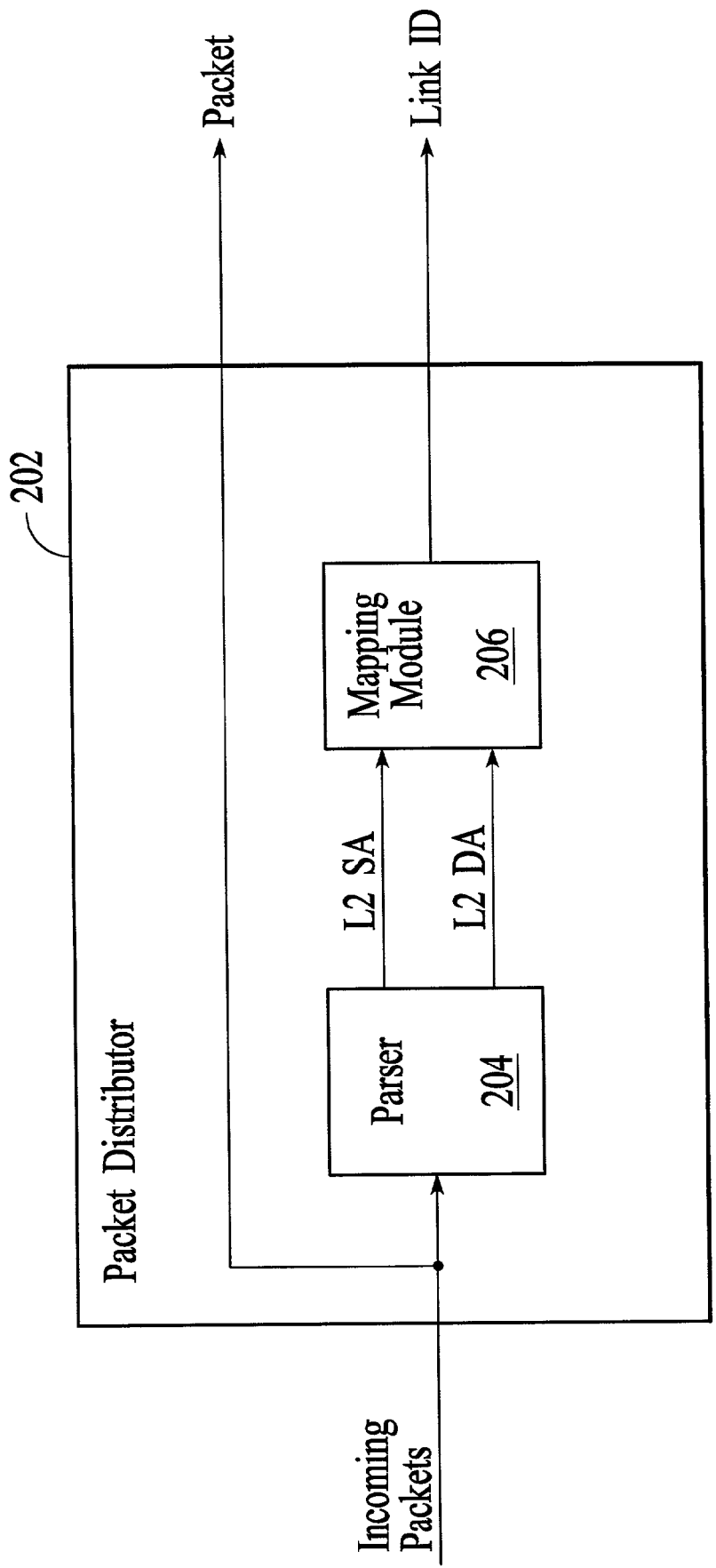
FIG. 2 depicts a frame distributor that includes a parser and a mapping module that are used to generate an output link ID for each incoming packet by applying the same mapping algorithm to the same fields of each packet as is known in the prior art.

In the example of FIG. 7, it is assumed that the set C packets fit within a category that does not require the original order of the packets to be maintained (for example, routed packets). Because different mapping algorithms can be applied to different categories of packets, the set C packets can be distributed in a different manner than the set A, B, and D packet. Being able to apply different mapping algorithms to different packet categories enables the overall distribution of packets among the output links to be controlled to a higher degree than packet distribution techniques that apply the same mapping algorithm to all packets regardless of the packet type. In the example of FIG. 7, distributing the set C packets in a round-robin manner causes the incoming stream of packets to be more evenly distributed among the output links than the distribution of the same incoming packet stream that is shown in the example of FIG. 1. Even distribution of packets among the output links can reduce delays and improve efficiency.

Although in the example of FIGS. 3 and 4, a 10 GbE stream is distributed among ten 1 GbE streams, there is no requirement that a specific distribution ratio be achieved. The aggregate of the output link transmission rates also does not have to be an exact multiple of the input link transmission rate. In addition, it is not a requirement that the input link transmission rate is higher than the individual output link transmission rates.

Figure 8:
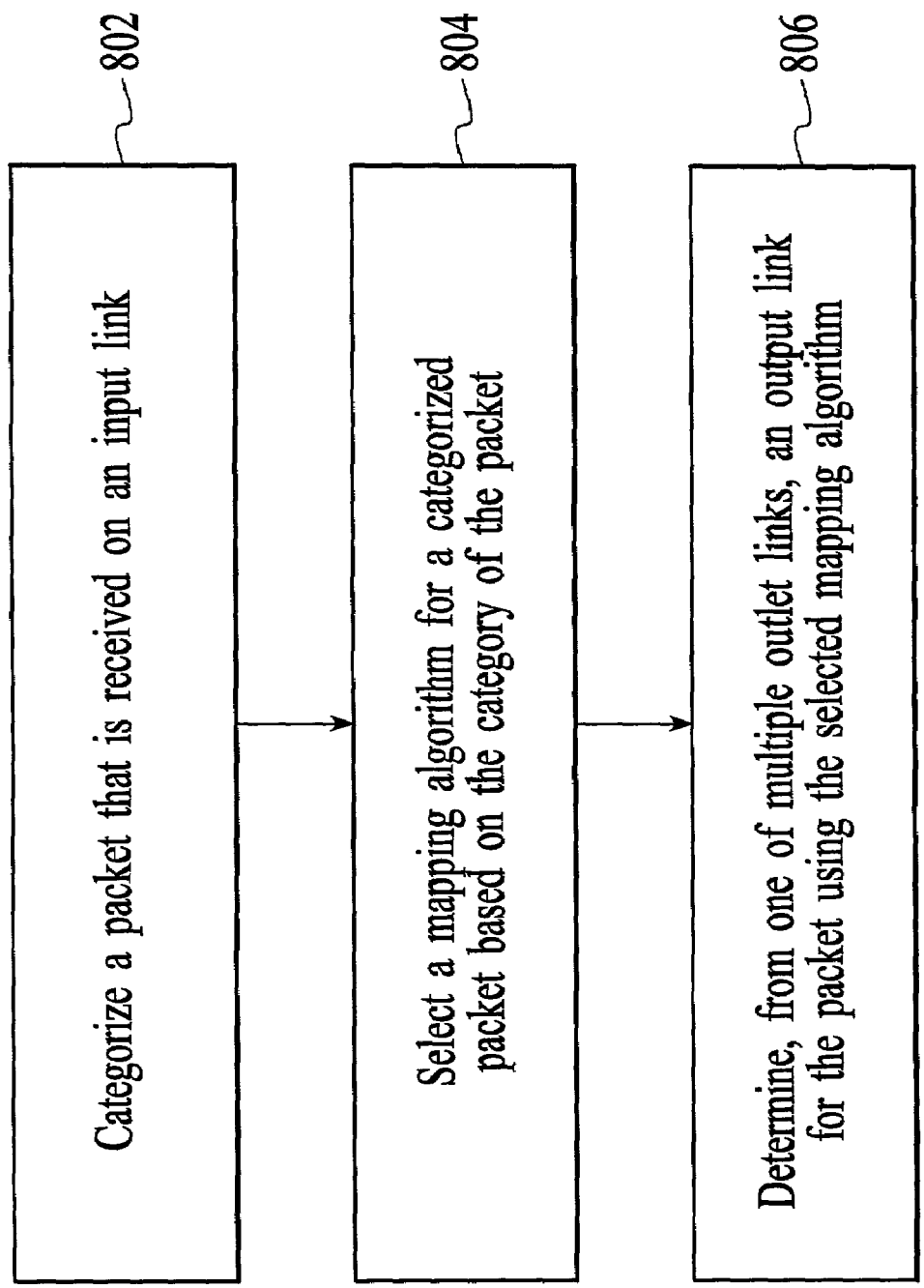
FIG. 8 is a process flow diagram of a method for distributing packets from an input link to multiple output links in accordance with an embodiment of the invention.

A method for distributing packets from an input link to multiple output links is depicted in the process flow diagram of FIG. 8. At step 802, a packet that is received on an input link is categorized. At step 804, a mapping algorithm is selected for the categorized packet based on the category of the packet. At step 806, an output link, from one of the multiple output links, is determined for the packet using the selected mapping algorithm.

Although specific embodiments of the invention have been described and illustrated, the invention is not to be limited to the specific forms or arrangements of parts as described and illustrated herein. The invention is limited only by the claims.

What is claimed is:

1. A method for distributing packets from an input link to multiple output links comprising:
    categorizing a packet that is received on said input link;
    selecting a mapping algorithm identifier (ID) for said categorized packet based on the category of said packet, wherein said mapping algorithm ID includes:
        1) programmable registers reserved to indicate a selected mapping algorithm; and
        2) programmable registers reserved to indicate at least one packet header field among a plurality of packet header fields of the packet that is to be used in a hashing operation;
    generating multiple output link IDs for the packet using different mapping algorithms, wherein said multiple output link IDs correspond to said multiple output links;
    selecting one of the multiple output link IDs in response to the mapping algorithm ID; and
    distributing said packet to the output link that corresponds to the selected one of the multiple output link IDs.

2. The method of claim 1 wherein selecting a mapping algorithm includes selecting from one of hashing, round-robin distribution, and load balancing.

3. The method of claim 1 wherein categorizing a packet includes selecting a category from a group of categories that includes at least one of switched IP/TCP packets, switched IP/UDP packets, switched IP/other packets, switched other packets, routed IP/TCP packets, routed IP/UDP packets, routed IP/other packets, routed other packets, and MPLS packets.

4. The method of claim 1 wherein categorizing a packet includes identifying whether a packet is a switched packet or a routed packet.

5. The method of claim 1 wherein categorizing a packet includes reading a layer 2 destination address field of said packet to determine if said packet is a switched or routed packet.

6. The method of claim 1 wherein categorizing a packet includes reading an Ethernet type/length field of said packet to determine the network layer protocol of said packet.

7. The method of claim 1 wherein categorizing a packet includes reading an IP protocol field of said packet to determine the transport layer protocol of said packet.

8. The method of claim 1 wherein categorizing a packet includes:
    reading a layer 2 destination address field of said packet to determine if said packet is a switched or routed packet;
    reading an Ethernet type/length field of said packet to determine the network layer protocol of said packet; and
    reading an IP protocol field of said packet to determine the transport layer protocol of said packet.

9. The method of claim 1 wherein categorizing a packet includes:
    parsing fields from the header of said packet;
    determining the category of said packet from said parsed fields.

10. The method of claim 9 wherein selecting one of the multiple output link IDs includes one of:
    hashing the at least one packet header field indicated in the programmable registers of the selected mapping algorithm ID to generate an output link ID;
    selecting output link IDs on a round-robin basis; and
    selecting output link IDs in response to output link load information.

11. A system for distributing packets from an input link to multiple output links comprising:
    a packet categorizer for categorizing a packet that is received on said input link; and
    an output link determination unit for selecting a mapping algorithm for said categorized packet based on the category of said packet and for determining an output link for said packet using said selected mapping algorithm, said determined output link being one of said multiple output links, wherein said output link determination unit is configured to generate multiple different output link IDs for the packet and to select one of the multiple different output link IDs based on the category of the packet,
    wherein said output link determination unit includes a mapping algorithm selector for selecting a mapping algorithm from a group of mapping algorithms, said mapping algorithm selector configured to store multiple mapping algorithm identifiers (IDs) that are selected based on the category of said packet, wherein the mapping algorithm IDs include programmable registers reserved to 1) indicate a selected mapping algorithm, and 2) indicate at least one packet header field among a plurality of packet header fields of the packet that is to be used in a hashing operation.

12. The system of claim 11 wherein said mapping algorithm selector selects a mapping algorithm in response to the mapping algorithm ID from one of hashing, round-robin distribution, and load balancing.

13. The system of claim 11 wherein said packet categorizer selects a category from a group of categories that includes at least one of switched IP/TCP packets, switched IP/UDP packets, switched IP/other packets, switched other packets, routed IP/TCP packets, routed IP/UDP packet, routed IP/other packets, routed other packets, and MPLS packets.

14. The system of claim 11 wherein said packet categorizer identifies whether a packet is a switched packet or a routed packet.

15. The system of claim 11 wherein said packet categorizer reads a layer 2 destination address field of said packet to determine if said packet is a switched or routed packet.

16. The system of claim 11 wherein said packet categorizer reads an Ethernet type/length field of said packet to determine the network layer protocol of said packet.

17. The system of claim 11 wherein said packet categorizer reads an IP protocol field of said packet to determine the transport layer protocol of said packet.

18. The system of claim 11 wherein said packet categorizer:
    reads a layer 2 destination address field of said packet to determine if said packet is a switched or routed packet;
    reads an Ethernet type/length field of said packet to determine the network layer protocol of said packet; and
    reads an IP protocol field of said packet to determine the transport layer protocol of said packet.

19. The system of claim 11 wherein said packet categorizer includes a parser for parsing fields from the header of said packet and a categorizer unit for determining the category of said packet from said parsed fields.

20. The system of claim 19 wherein said output link determination unit includes:
a hashing unit for hashing the at least one packet header field indicated in the programmable registers of the selected mapping algorithm ID to generate an output link ID;

a round-robin unit for determining output link IDs on a round-robin basis; and a load balancing unit for determining output link IDs in response to output link load information.

* * * * *